(12) United States Patent
Lai et al.

(10) Patent No.: US 11,506,879 B2
(45) Date of Patent: Nov. 22, 2022

(54) OPTICAL SUPER-RESOLUTION MICROSCOPIC IMAGING SYSTEM

(71) Applicant: Beijing Century Sunny Technology Co., Ltd., Beijing (CN)

(72) Inventors: Bo Lai, Nanning (CN); Jiguang Wang, Beijing (CN)

(73) Assignee: Beijing Century Sunny Technology Co., Ltd., Beijing (CN)

( * ) Notice: Subject to any disclaimer, the term of this patent is extended or adjusted under 35 U.S.C. 154(b) by 322 days.

(21) Appl. No.: 17/009,375

(22) Filed: Sep. 1, 2020

(65) Prior Publication Data

US 2021/0072525 A1    Mar. 11, 2021

(30) Foreign Application Priority Data

Sep. 5, 2019    (CN) .......................... 201910837101.7
Sep. 5, 2019    (CN) .......................... 201921470215.4

(51) Int. Cl.
*G02B 21/00*    (2006.01)
*G02B 27/30*    (2006.01)
*G02B 27/58*    (2006.01)
*G02B 26/10*    (2006.01)
(Continued)

(52) U.S. Cl.
CPC ..... *G02B 21/0072* (2013.01); *G01N 21/6458* (2013.01); *G02B 21/0048* (2013.01); *G02B 21/0076* (2013.01); *G02B 26/101* (2013.01); *G02B 27/0955* (2013.01); *G02B 27/30* (2013.01); *G02B 27/58* (2013.01);
(Continued)

(58) Field of Classification Search
CPC ............ G02B 21/0072; G02B 21/0048; G02B 21/0076; G02B 26/101; G02B 27/0955; G02B 27/30; G02B 27/58; G01N 21/6458; G01N 2201/06113; G01N 2201/0633
See application file for complete search history.

(56) References Cited

U.S. PATENT DOCUMENTS

2006/0007535 A1*   1/2006   Gugel .................... G02B 21/16
                                                    359/368

FOREIGN PATENT DOCUMENTS

CN          109632735 A  *  4/2019   ......... G01N 21/6458

OTHER PUBLICATIONS

Translation of CN-109632735-A (Year: 2019).*

* cited by examiner

*Primary Examiner* — David P Porta
*Assistant Examiner* — Mamadou Faye
(74) *Attorney, Agent, or Firm* — CBM Patent Consulting, LLC

(57) ABSTRACT

The invention provides an optical super-resolution microscopic imaging system comprising a dichroic beamsplitter for annular parallel light to transmit through; a focusing lens used for converging the annular parallel light transmitted through the dichroic beamsplitter; a confocal pinhole for the annular parallel light after being converged to pass through to filter the annular parallel light; a varifocal lens system for collimating the annular parallel light passing through the confocal pinhole into excited annular parallel light; and a detector for receiving and processing fluorescence emitted by the excited sample, the fluorescence emitted by the excited sample being returned by the same way, and the dichroic beamsplitter separating the fluorescence emitted by
(Continued)

the sample from an annular parallel light path and turning the fluorescence to the detector to obtain a super-resolution image of the sample.

12 Claims, 4 Drawing Sheets

(51) Int. Cl.
    *G01N 21/64*     (2006.01)
    *G02B 27/09*     (2006.01)
(52) U.S. Cl.
    CPC ................ *G01N 2201/0633* (2013.01); *G01N 2201/06113* (2013.01)

OPTICAL SUPER-RESOLUTION MICROSCOPIC IMAGING SYSTEM

This application claims priority to Chinese Patent Application Ser. No. CN2019214702154 and CN2019108371017 filed 5 Sep. 2019.

TECHNICAL FIELD

The present invention relates to the field of biomedical microscopic imaging, and more particularly, to an optical super-resolution microscopic imaging system.

BACKGROUND

At present, there are mainly three optical super-resolution microscopic imaging technologies, comprising Stimulated Emission Depletion Microscopy (STED), Photoactivated Localization Microscopy (PALM)/Stochastic Optical Reconstruction Microscopy (STORM) and Structure Illumination Microscopy (SIM).

STED needs two strictly coaxial lasers, wherein one is excited light and the other is lost light. A system of STED is complicated in structure and high in construction cost. In addition, a resolution of STED is related to an intensity of the lost light, and the higher the intensity is, the higher the resolution is. However, excessively high intensity of the lost light may bring extra light damage to a biological sample, thus limiting an applicability of STED.

PALM/STORM uses a spectral characteristic to detect fluorescent molecules in a time-sharing manner and locate a central position, thus realizing super-resolution imaging of a sample densely marked with fluorescence. PALM/STORM needs lots of repetition of a process of activation-excitation-localization-bleaching, and needs imaging for thousands of times to reconstruct a super-resolution image. Therefore, the application of PALM/STORM is greatly limited.

SIM uses illumination light of one carrier frequency fringe to form Moire fringes on a sample. Fluorescence information of the sample is received by a CCD through an imaging system, and then a spatial domain and a frequency domain are changed through Fourier transform, thus obtaining a super-resolution image. In practical application, SIM is mainly limited by the CCD, so that it is difficult to balance a field of view and a super-resolution.

SUMMARY

One objective of the present invention is to solve at least the above problems and/or defects, and to provide at least the advantages to be described hereinafter.

Another objective of the present invention is to provide an optical super-resolution microscopic imaging system, which can remarkably improve a resolution of an image and obtain a super-resolution image.

In order to achieve these objectives and other advantages of the present invention, an optical super-resolution microscopic imaging system is provided, which comprises:

a dichroic beamsplitter used for annular parallel light to transmit through;

a focusing lens used for converging the annular parallel light transmitted through the dichroic beamsplitter;

a confocal pinhole used for the annular parallel light after being converged to pass through so as to filter the annular parallel light;

a varifocal lens system used for collimating the annular parallel light passing through the confocal pinhole into excited annular parallel light, the excited annular parallel light sequentially passing through a scanning lens and a microscope, and then forming a single fluorescent excited light spot with a diameter smaller than a diffraction limit of an objective lens on a sample positioned on a focal plane of the objective lens of the microscope; and a detector used for receiving and processing fluorescence emitted by the excited sample, the fluorescence emitted by the excited sample being returned by the same way, and passing through the microscope, the scanning lens, the varifocal lens system, the confocal pinhole and the focusing lens in sequence, and then the dichroic beamsplitter separating the fluorescence emitted by the sample from an annular parallel light path and turning the fluorescence to the detector to obtain a super-resolution image of the sample, wherein a diameter of an airy disk converged by the emit fluorescence of the sample after passing through the varifocal lens system is less than or equal to a size of the confocal pinhole, an inner diameter of the excited annular parallel light outgoing from the varifocal lens system is smaller than a diameter of the fluorescent incident into the varifocal lens system.

Preferably, the optical super-resolution microscopic imaging system further comprises:

a light source used for emitting a laser;

a collimating lens and an excitation filter lens, the laser emitted by the light source sequentially passing through the collimating lens and the excitation filter lens and then forming collimated and excited light; and a beam shaper, the excited light being shaped into the annular parallel light after passing through the beam shaper.

Preferably, according to the optical super-resolution microscopic imaging system, the beam shaper comprises a beam deformer, a long-focus convex lens and a short-focus convex lens arranged in sequence, the beam deformer deforms the excited light into the annular parallel light, and a zoom lens composed of the long-focus convex lens and the short-focus convex lens simultaneously reduces a diameter and a thickness of the annular parallel light according to a set multiple, so as to obtain the desired annular parallel light.

Preferably, according to the optical super-resolution microscopic imaging system, the beam deformer comprises a plano-concave cone lens and a plano-convex cone lens arranged in sequence.

Preferably, according to the optical super-resolution microscopic imaging system, the beam deformer is a variable annular aperture.

Preferably, the optical super-resolution microscopic imaging system further comprises XY galvanometer scanners arranged between the varifocal lens system and the scanning lens to scan the sample on the focal plane of the objective lens point by point.

Preferably, the optical super-resolution microscopic imaging system further comprises a three-dimensional stage with the sample arranged thereon, wherein the three-dimensional stage moves to drive the sample to move, so that the sample is completely and uniformly scanned.

Preferably, according to the optical super-resolution microscopic imaging system, a filter pinhole is arranged at a point where focuses of the long-focus convex lens and the short-focus convex lens coincide, and a diameter of the filter pinhole is larger than a diameter of a main light spot formed by the annular parallel light converged through the long-focus convex lens, and smaller than a first side lobe formed by the annular parallel light converged through the long-focus convex lens.

Preferably, according to the optical super-resolution microscopic imaging system, the detector is a photoelectric detector, and the photoelectric detector receives the fluorescence emitted by the excited sample, converts the fluorescence into an electrical signal, and then sends the electrical signal to a computer, so as to obtain a super-resolution image of the sample.

Preferably, according to the optical super-resolution microscopic imaging system, the detector is an area-array detector, and the area-array detector receives the fluorescence emitted by the excited sample and executes imaging, and then sends the image to a computer, so as to obtain a super-resolution image of the sample; and a specific imaging process of the area-array detector is as follows:

1) when the excited annular parallel light moves relative to the sample, a scanning step distance being equal to one $n^{th}$ of a half-peak width of a fluorescent excited light spot formed by the excited annular parallel light on the sample, and n being an even number greater than 1; scanning x×y points in total;

2) acquiring x×y 5×5 or 7×7 images in total, and reconstructing an image with a pixel of x×y according to the images;

3) the reconstructed image being composed of a plurality of Gaussian circular spots with a normalized intensity, and a half-peak width thereof being n/2 pixels;

4) when the excited annular parallel light moves to a position (a, b), when an intensity of a central pixel of the 5×5 or 7×7 image is highest, and an intensity of each pixel is continuously distributed, the reconstructed image only having one Gaussian circular spot with a central position at (a, b), and an intensity thereof being equal to the intensity of the central pixel of the 5×5 or 7×7 image; and 5) if the reconstructed image has one Gaussian circular spot with a central position at (c, d), both sides thereof having a Gaussian circular spot at a distance less than or equal to n/2 pixels, and an intensity of the Gaussian circular spot being equal to or greater than an intensity of the Gaussian circular spot with the central position at (c, d), then the reconstructed image subtracting the Gaussian circular spot with the central position at (c, d).

Preferably, the optical super-resolution microscopic imaging system further comprises an emission filter lens arranged between the dichroic beamsplitter and the detector, filtering out stray light in other wave bands and only enabling the fluorescence emitted by the sample to transmit through.

Preferably, according to the optical super-resolution microscopic imaging system, the varifocal lens system is composed of a first lens and a second lens with variable positions and fixed focal lengths, or the varifocal lens system is composed of a continuous varifocal lens with variable positions.

The present invention at least has the following beneficial effects: due to the arranged focusing lens, the annular parallel light transmitting through the dichroic beamsplitter is converged, the converged annular parallel light passes through the confocal pinhole, and the annular parallel light passing through the confocal pinhole transmits through the varifocal lens system to be collimated into the excited annular parallel light, so that the obtained excited annular parallel light can form the single fluorescent excited light spot with the diameter smaller than the diffraction limit of the objective lens on the sample positioned on the focal plane of the objective lens of the microscope after passing through the scanning lens and the microscope in sequence, and the super-resolution image with a resolution increased by at least 1.6 times may be obtained without calculation and reconstruction. Moreover, since the diameter of the confocal pinhole is greater than or equal to the diffraction limit of the objective lens, the present invention also keeps maximum light collection efficiency.

Other advantages, objectives and features of the present invention will be partially reflected by the following description, and will be partially understood by those skilled in the art through study and practice of the present invention.

DETAILED DESCRIPTION

The present invention will be further described in detail hereinafter with reference to the accompanying drawings, so that those skilled in the art can implement according to the specification.

It should be understood that terms such as "have", "contain" and "comprise" used herein do not indicate the existence or addition of one or more other elements or combinations thereof.

Figure 1:
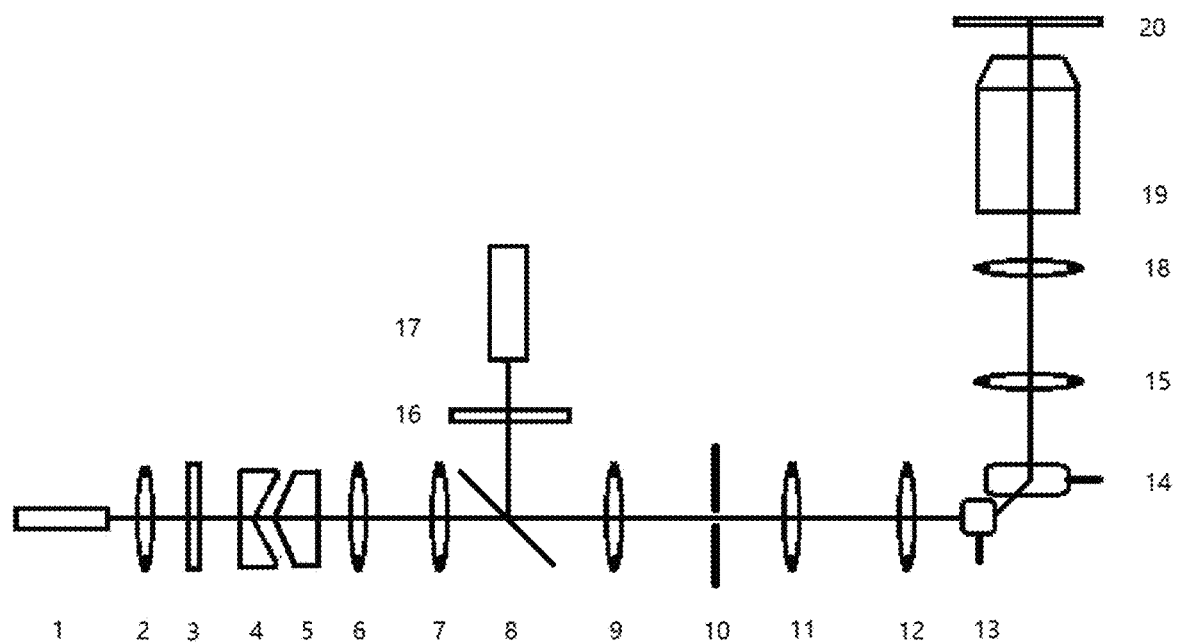
FIG. 1 is a structure diagram of an optical super-resolution microscopic imaging system in one embodiment of the present invention.

As shown in FIG. 1, an optical super-resolution microscopic imaging system provided in one embodiment of the present invention comprises: a dichroic beamsplitter 8 used for annular parallel light to transmit through; a focusing lens 9 used for converging the annular parallel light transmitted through the dichroic beamsplitter 8; a confocal pinhole 10 used for the annular parallel light after being converged to pass through so as to filter the annular parallel light; a varifocal lens system used for collimating the annular parallel light passing through the confocal pinhole into excited annular parallel light, the excited annular parallel light sequentially passing through a scanning lens 15 and a microscope, and then forming a single fluorescent excited light spot with a diameter smaller than a diffraction limit of an objective lens 19 on a sample 20 positioned on a focal plane of the objective lens of the microscope, the microscope comprising a cylindrical lens 18 and the objective lens 19; and a detector 17 used for receiving and processing fluorescence emitted by the excited sample, the fluorescence emitted by the excited sample being returned by the same way, and passing through the microscope, the scanning lens 15, the varifocal lens system, the confocal pinhole 10 and the focusing lens 9 in sequence, and then the dichroic beamsplitter 8 separating the fluorescence emitted by the sample from an annular parallel light path and turning the fluorescence to the detector 17 to obtain a super-resolution image of the sample. A diameter of an airy disk converged by the emit fluorescence of the sample after passing through the varifocal lens system is less than or equal to a size of the confocal pinhole, an inner diameter of the excited annular parallel light outgoing from the varifocal lens system is smaller than a diameter of the fluorescent incident into the varifocal lens system.

Due to the focusing lens arranged, the annular parallel light transmitting through the dichroic beamsplitter is converged, the converged annular parallel light passes through the confocal pinhole, and the annular parallel light passing through the confocal pinhole transmits through the varifocal lens system to be collimated into the excited annular parallel light, so that the obtained excited annular parallel light can form the single fluorescent excited light spot with the diameter smaller than the diffraction limit of the objective lens on the sample positioned on the focal plane of the objective lens of the microscope after passing through the scanning lens and the microscope in sequence, and the super-resolution image with a resolution increased by at least 1.6 times may be obtained without calculation and reconstruction.

In one specific embodiment, as shown in FIG. 1, the optical super-resolution microscopic imaging system further comprises: a light source 1 used for emitting a laser; a collimating lens 2 and an excitation filter lens 3, the laser emitted by the light source sequentially passing through the collimating lens 2 and the excitation filter lens 3 and then becoming collimated and excited light; and a beam shaper, the excited light being shaped into the annular parallel light after passing through the beam shaper.

In order to facilitate formation of the annular parallel light and obtain the annular parallel light of a required size, as shown in FIG. 1, in one specific embodiment, according to the optical super-resolution microscopic imaging system, the beam shaper comprises a beam deformer, a long-focus convex lens 6 and a short-focus convex lens 7 arranged in sequence, the beam deformer deforms the excited light into the annular parallel light, and a zoom lens composed of the long-focus convex lens 6 and the short-focus convex lens 7 simultaneously reduces a diameter and a thickness of the annular parallel light according to a set multiple, so as to obtain the desired annular parallel light.

Specifically, in one specific embodiment, as shown in FIG. 1, according to the optical super-resolution microscopic imaging system, the beam deformer comprises a plano-concave cone lens 4 and a plano-convex cone lens 5 arranged in sequence.

Figure 3:
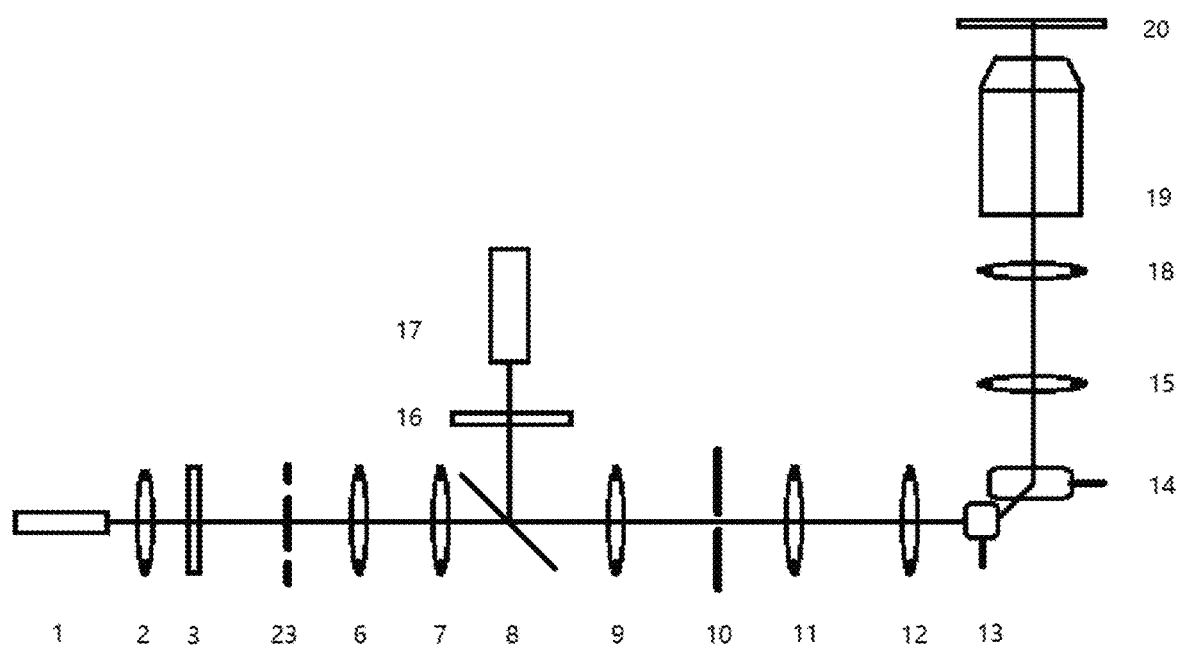
FIG. 3 is a structure diagram of an optical super-resolution microscopic imaging system in another embodiment of the present invention.

Specifically, in one specific embodiment, as shown in FIG. 3, according to the optical super-resolution microscopic imaging system, the beam deformer is a variable annular aperture 23.

In order to facilitate complete scanning of the sample, as shown in FIG. 1, in one specific embodiment, the optical super-resolution microscopic imaging system further comprises XY galvanometer scanners 13 and 14 arranged between the varifocal lens system and the scanning lens 15 to scan the sample on the focal plane of the objective lens point by point.

Figure 2:
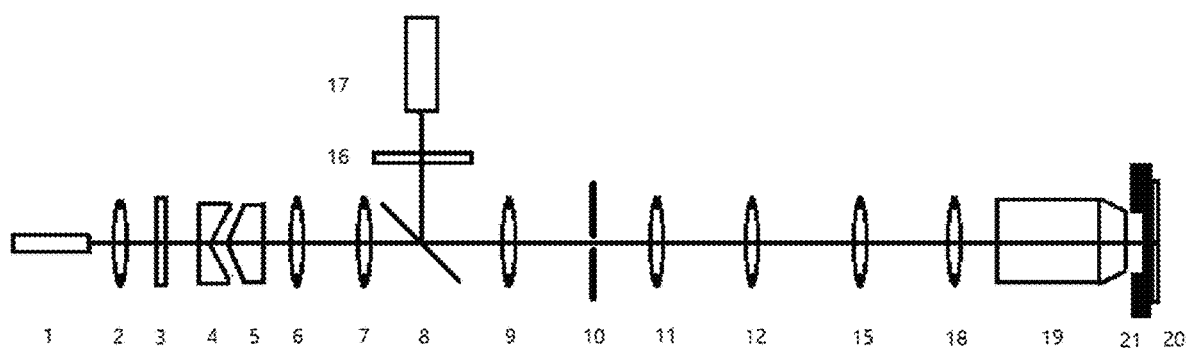
FIG. 2 is a structure diagram of an optical super-resolution microscopic imaging system in another embodiment of the present invention.

In order to completely scan the sample, in another specific embodiment, as shown in FIG. 2, the optical super-resolution microscopic imaging system further comprises a three-dimensional stage 21 with the sample 20 arranged thereon, wherein the three-dimensional stage moves to drive the sample to move, so that the sample is completely and uniformly scanned.

Figure 5:
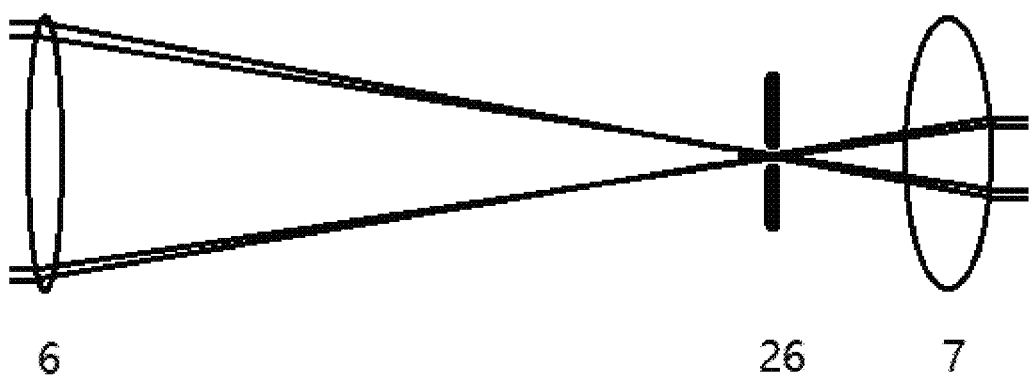
FIG. 5 is a structure diagram of a zoom lens and a filter pinhole in the optical super-resolution microscopic imaging system in another embodiment of the present invention.

In one specific embodiment, as shown in FIG. 5, according to the optical super-resolution microscopic imaging system, a filter pinhole 26 is arranged at a point where focuses of the long-focus convex lens 6 and the short-focus convex lens 7 coincide, and a diameter of the filter pinhole is larger than a diameter of a main light spot formed by the annular parallel light converged through the long-focus convex lens, and smaller than a first side lobe formed by the annular parallel light converged through the long-focus convex lens.

In order to facilitate quick processing of the received fluorescence, in one specific embodiment, according to the optical super-resolution microscopic imaging system, the detector 17 is a photoelectric detector, and the photoelectric detector receives the fluorescence emitted by the excited sample, converts the fluorescence into an electrical signal, and then sends the electrical signal to a computer, so as to obtain a super-resolution image of the sample.

In another specific embodiment, according to the optical super-resolution microscopic imaging system, the detector 17 is an area-array detector, and the area-array detector receives the fluorescence emitted by the excited sample and executes imaging, and then sends the image to a computer, so as to obtain a super-resolution image of the sample. A specific imaging process of the area-array detector is as follows:

1) when the excited annular parallel light moves relative to the sample, a scanning step distance being equal to one $n^{th}$ of a half-peak width of a fluorescent excited light spot formed by the excited annular parallel light on the sample, and n being an even number greater than 1; scanning x×y points in total;

2) acquiring x×y 5×5 or 7×7 images in total, and reconstructing an image with a pixel of x×y according to the images;

3) the reconstructed image being composed of a plurality of Gaussian circular spots with a normalized intensity, and a half-peak width thereof being n/2 pixels;

4) when the excited annular parallel light moves to a position (a, b), when an intensity of a central pixel of the 5×5 or 7×7 image is highest, and an intensity of each pixel is continuously distributed, the reconstructed image only having one Gaussian circular spot with a central position at (a, b), and an intensity thereof being equal to the intensity of the central pixel of the 5×5 or 7×7 image; and 5) if the reconstructed image has one Gaussian circular spot with a central position at (c, d), both sides thereof having a Gaussian circular spot at a distance less than or equal to n/2 pixels, and an intensity of the Gaussian circular spot being equal to or greater than an intensity of the Gaussian circular spot with the central position at (c, d), then the reconstructed image subtracting the Gaussian circular spot with the central position at (c, d).

In order to filter out stray light in the fluorescence emitted by the excited sample, in one specific embodiments, as shown in FIG. 1, the optical super-resolution microscopic imaging system further comprises an emission filter lens 16 arranged between the dichroic beamsplitter 8 and the detector 17, filtering out stray light in other wave bands and only enabling the fluorescence emitted by the sample to transmit through.

Figure 4:
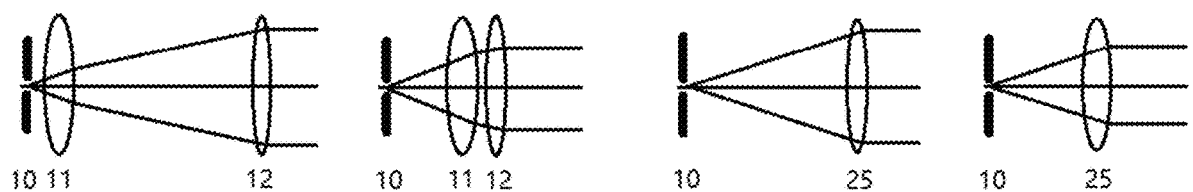
FIG. 4 is a structure diagram of a varifocal lens system in the optical super-resolution microscopic imaging system in another embodiment of the present invention.

In one specific embodiment, as shown in FIG. 4, according to the optical super-resolution microscopic imaging system, the varifocal lens system is composed of a first lens 11 and a second lens 12 with variable positions and fixed focal lengths, or the varifocal lens system is composed of a continuous varifocal lens 25 with variable positions.

Figure 6:
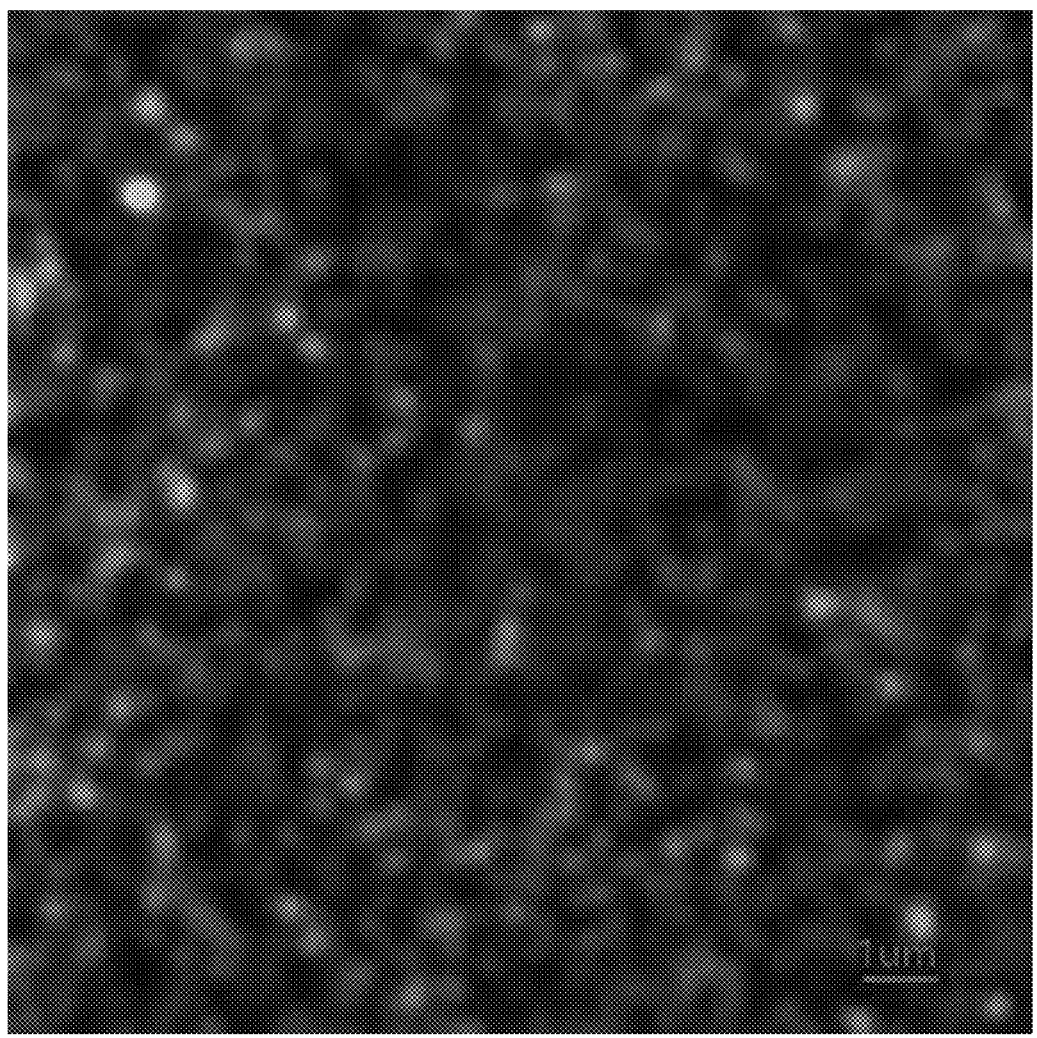
FIG. 6 is an image obtained in the prior art.
Figure 7:
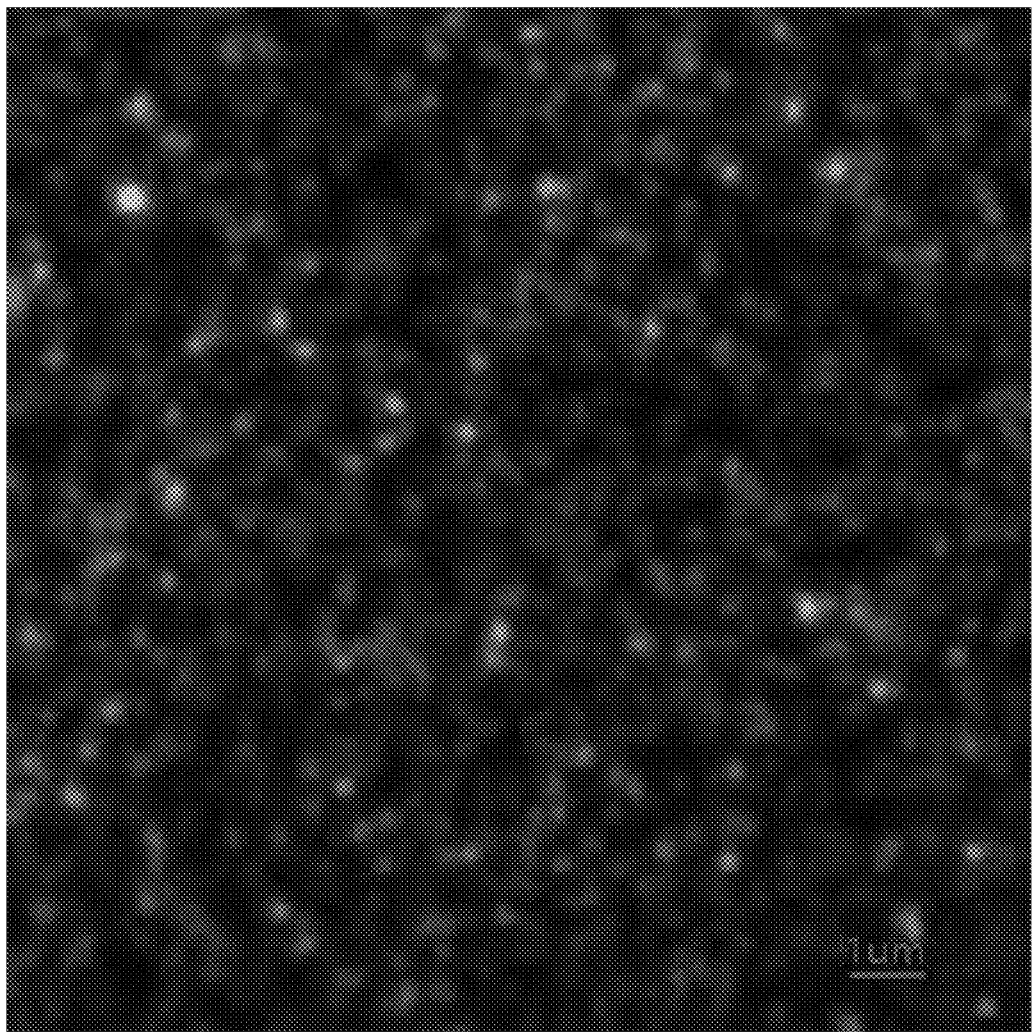
FIG. 7 is an image obtained by using the embodiments of the present invention.

As described above, the system described in the embodiments of the present invention remarkably improves a resolution of an image, so that the resolution can be increased by 1.6 times, and obtains a super-resolution image. As shown in FIG. 6 and FIG. 7, FIG. 6 is an image obtained in the prior art, and FIG. 7 is an image obtained by the embodiments of the present invention. It is obvious that the image obtained by the embodiments of the present invention is clear.

Although the embodiments of the present invention have been disclosed above, the present invention is not limited to the applications listed in the specification and the embodiments. The present invention can be applied to various fields suitable for the present invention absolutely. Additional modifications can be easily implemented by those skilled in the art. Therefore, the present invention is not limited to the specific details and illustrations shown and described herein without departing from the general concepts defined by the claims and equivalent scopes.

What is claimed is:

1. An optical super-resolution microscopic imaging system, comprising: a dichroic beamsplitter used for annular parallel light to transmit through; a focusing lens used for converging the annular parallel light transmitted through the dichroic beamsplitter; a confocal pinhole used for the annular parallel light after being converged to pass through so as to filter the annular parallel light; a varifocal lens system used for collimating the annular parallel light passing through the confocal pinhole into excited annular parallel light, the excited annular parallel light sequentially passing through a scanning lens and a microscope, and then forming a single fluorescent excited light spot with a diameter smaller than a diffraction limit of an objective lens on a sample positioned on a focal plane of the objective lens of the microscope; and a detector used for receiving and processing fluorescence emitted by the excited sample, the fluorescence emitted by the excited sample being returned by the same way, and passing through the microscope, the scanning lens, the varifocal lens system, the confocal pinhole and the focusing lens in sequence, and then the dichroic beamsplitter separating the fluorescence emitted by the sample from an annular parallel light path and turning the fluorescence to the detector to obtain a super-resolution image of the sample, wherein a diameter of an airy disk converged by the emitted fluorescence of the sample passing through the varifocal lens system is less than or equal to a size of confocal pinhole, and an inner diameter of the excited annular parallel light outgoing from the varifocal lens system is smaller than a diameter of the fluorescent incident into the varifocal lens system.

2. The optical super-resolution microscopic imaging system according to claim 1, further comprising:
a light source used for emitting a laser;
a collimating lens and an excitation filter lens, the laser emitted by the light source sequentially passing through the collimating lens and the excitation filter lens and then forming collimated excited light; and
a beam shaper, the excited light being shaped into the annular parallel light after passing through the beam shaper.

3. The optical super-resolution microscopic imaging system according to claim 2, wherein the beam shaper comprises a beam deformer, a long-focus convex lens and a short-focus convex lens arranged in sequence, the beam deformer deforms the excited light into the annular parallel light, and a zoom lens composed of the long-focus convex lens and the short-focus convex lens simultaneously reduces a diameter and a thickness of the annular parallel light according to a set multiple, so as to obtain the desired annular parallel light.

4. The optical super-resolution microscopic imaging system according to claim 3, wherein the beam deformer comprises a plano-concave cone lens and a plano-convex cone lens arranged in sequence.

5. The optical super-resolution microscopic imaging system according to claim 3, wherein the beam deformer is a variable annular aperture.

6. The optical super-resolution microscopic imaging system according to claim 1, further comprising XY galvanometer scanner arranged between the varifocal lens system and the scanning lens to scan the sample on the focal plane of the objective lens point by point.

7. The optical super-resolution microscopic imaging system according to claim 1, further comprising a three-dimensional stage with the sample arranged thereon, wherein the three-dimensional stage moves to drive the sample to move, so that the sample is completely and uniformly scanned.

8. The optical super-resolution microscopic imaging system according to claim 3, wherein a filter pinhole is arranged at a point where focuses of the long-focus convex lens and the short-focus convex lens are coincided, and a diameter of the filter pinhole is larger than a diameter of a main light spot formed by the annular parallel light converged through the long-focus convex lens, and smaller than a first side lobe formed by the annular parallel light converged through the long-focus convex lens.

9. The optical super-resolution microscopic imaging system according to claim 1, wherein the detector is a photoelectric detector, and the photoelectric detector receives the fluorescence emitted by the excited sample, converts the fluorescence into an electrical signal, and then sends the electrical signal to a computer, so as to obtain a super-resolution image of the sample.

10. The optical super-resolution microscopic imaging system according to claim 6, wherein the detector is an area-array detector, and the area-array detector receives the fluorescence emitted by the excited sample and performs imaging, and then sends the image to a computer, so as to obtain a super-resolution image of the sample; and a specific imaging process of the area-array detector is as follows:
1) when the excited annular parallel light moves relative to the sample, a scanning step distance being equal to one $n^{th}$ of a half-peak width of a fluorescent excited light spot formed by the excited annular parallel light on the sample, and n being an even number greater than 1; scanning x×y points in total;
2) acquiring x×y 5×5 or 7×7 images in total, and reconstructing an image with a pixel of x×y according to the images;
3) the reconstructed image being composed of a plurality of Gaussian circular spots with a normalized intensity, and a half-peak width thereof being n/2 pixels;
4) when the excited annular parallel light moves to a position (a, b), when an intensity of a central pixel of the 5×5 or 7×7 image is highest, and an intensity of each pixel is continuously distributed, the reconstructed image only having one Gaussian circular spot with a central position at (a, b), and an intensity thereof being equal to the intensity of the central pixel of the 5×5 or 7×7 image; and
5) if the reconstructed image has one Gaussian circular spot with a central position at (c, d), both sides thereof having a Gaussian circular spot at a distance less than or equal to n/2 pixels, and an intensity of the Gaussian circular spot being equal to or greater than an intensity of the Gaussian circular spot with the central position at (c, d), then the reconstructed image subtracting the Gaussian circular spot with the central position at (c, d).

11. The optical super-resolution microscopic imaging system according to claim 1, further comprising an emission filter lens arranged between the dichroic beamsplitter and the detector, filtering out stray light in other wave bands and only enabling the fluorescence emitted by the sample to transmit through.

12. The optical super-resolution microscopic imaging system according to claim 1, wherein the varifocal lens system is composed of a first lens and a second lens with variable positions and fixed focal lengths, or the varifocal lens system is composed of a continuous varifocal lens with variable positions.

* * * * *